United States Patent Office 3,251,840
Patented May 17, 1966

---

3,251,840
3-SULFAMYL PHENYL-5-AMINOALKYL-1,2,4-OXADIAZOLES
Giuseppe Palazzo, Rome, Italy, assignor to Aziende Chimiche Riunite Angelini Francesco, Rome, Italy, a corporation of Italy
No Drawing. Filed June 14, 1962, Ser. No. 202,400
Claims priority, application Italy, June 17, 1961, 11,146/61
12 Claims. (Cl. 260—247.1)

This invention relates to sulfamyl oxadiazoles, to processes and intermediates used in their preparation and to pharmaceutical compositions containing them.

It has been discovered that the 3-sulfamylphenyl-5-aminoalkyl-1,2,4-oxadiazoles of the formula:

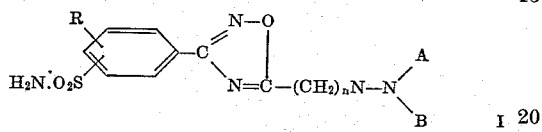

and their acid addition salts, where R represents a hydrogen or chlorine atom, $n$ represents 1, 2 or 3, and A and B, which may be the same or different, represent hydrogen atoms or lower alkyl groups (e.g. methyl, ethyl, propyl or butyl groups), or together with the adjacent nitrogen represent a pyrrolidine, piperidine or morpholine ring, possess interesting pharmacodynamic properties indicative of utility in therapeutics. The terms sulfamyl and sulphamido are used synonymously in the present specification to designate the $H_2NO_2S-$ radical.

Thus, products of the above formula possess sedative, analgesic, anti-inflammatory, and diuretic effects. Studies of the activity of these substances employing the method of Irwin (communication at the Gordon Research Conference on Medicinal Chemistry, August 3–7, 1959 at Colby Junior College, New London) showed that 3-(p-sulphamidophenyl) - 5 - pyrrolidinomethyl - 1,2,4-oxadiazole and 3 - p-sulphamidophenyl - 5 - β-morpholinoethyl-1,2,4-oxadiazole possess a very pronounced sedative action, while 3-p-sulphamidophenyl-5-butylaminomethyl-1,2,4-oxadiazole and 3-(3'-sulphamido-4'-chlorophenyl)-5 - diethylaminomethyl - 1,2,4 - oxadiazole also show some activity. 3 - p - sulphamidophenyl - 5 - diethylaminomethyl - 1,2,4-oxadiazole and of 3 - m - sulphamidophenyl - 5 - diethylaminomethyl-1,2,4-oxadiazole have a convulsant effect. 3 - p - sulphamidophenyl-5-β-diethylaminoethyl-1,2,4-oxadiazole has a particularly interesting analgesic action and it is not less active than aspirin in the test of Siegmund et al. (Proc. Soc. Exper. Biol. Med. 1957, 95, 729) and that of Randall and Selitto (Arch. Int. Pharmacodyn. 1957, 111, 409). 3 -p - sulphamidophenyl - 5 - β - diethylaminoethyl-1,2,4-oxadiazole has an antioedemic action, which is revealed inter alia by the test of Randall (Arch. Intern. Pharmacodyn. 1957, 113, 233), and which is not lower than that of phenylbutazone. All the products of the group show diuretic activity. 3-p - sulphamidophenyl-5-diethylaminomethyl-1,2,4-oxadiazole is particularly responsive to the test of Lipschitz (Journal of Pharmacology and Experimental Therapeutics 79, 97, 1943). All the compounds of the invention are of low toxicity, and are therefore suitable for human therapy.

According to the invention the compounds of Formula I are prepared by reacting an amine of formula HNAB with a compound of the formula:

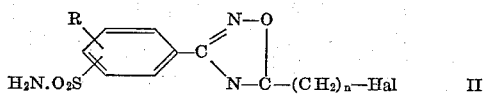

where Hal represents a halogen atom and R, $n$, A and B are as hereinbefore defined.

Alternatively, they may be prepared by heating a compound of the formula:

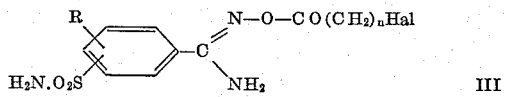

where Hal represents a halogen atom and R and $n$ are as hereinbefore defined, to effect cyclization and subsequently reacting the cyclized product with an amine of formula HNAB, where A and B are as hereinbefore defined.

A further alternative method of the invention comprises reacting a compound of the formula:

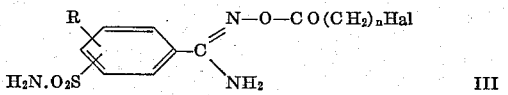

with an amine of formula HNAB, where R, $n$, A and B are as hereinbefore defined.

In these methods the reaction with the amine is preferably carried out at between 60° and 140° C. in an inert solvent. Conveniently, the solvent is a lower alcohol or an aromatic hydrocarbon and the reaction is effected at or above atmospheric pressure. In the third of these methods the water formed in the reaction is conveniently removed azeotropically.

The preliminary cyclization in the second of the three processes mentioned above is effected simply by heating the starting material either by itself or in an inert solvent at or below atmospheric pressure.

The product of the cyclization is a compound of Formula II, and these compounds are, with the exception of 3 - p - sulphamidophenyl-5-chloromethyl-1,2,4-oxadiazole, new.

The compounds of Formula III, which are new compounds, are prepared by the action of an appropriate halo-acyl halide on a benzamidoxime of formula:

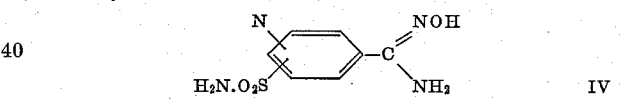

where R is as hereinbefore defined. This reaction is preferably carried out in the presence of an acid-binding agent, such as an alkali or alkaline earth metal carbonate or bicarbonate.

Of the compounds of Formula IV, 5-sulphamido-4-chlorobenzamidoxime and 3 - sulphamidobenzamidoxime are new. Their preparation is given in the examples below. The former is prepared from 3-sulphamido-4-chlorobenzonitrile which is also a new compound.

The following examples illustrate the invention.

EXAMPLE I

*3-sulphamidobenzamidoxime*

0.067 mole of m-sulphamidobenzonitrile are added to 0.072 mole of free hydroxylamine in methanol solution, and the mixture is refluxed for 4 hours. The solvent is eliminated at a reduced pressure and the residue is treated with a small quantity of water. The product so obtained, 3-sulphamidobenzamidoxime, is a solid substance which is pure enough for the following procedures. The yield is 85%. The substance can be crystallized from water. Melting point: 178–9° C. dec. Analysis: Found N percent=19.40; calc. for $C_7H_9N_3O_3S$, N percent=19.53.

EXAMPLE II

*3-sulphamido-4-chlorobenzonitrile*

157 g. of 4-chlorobenzoic acid are added to 590 g. of chlorosulphuric acid, the mixture being cooled with ice water. The mixture is then heated for 2 hours at 160–5°

C. and during the heating the 4-chlorobenzoic acid is completely dissolved. The reaction products are cooled and poured onto 3 kg. of crushed ice. The mixture is then filtered, and the residue is washed with water and dried. In this manner 200 g. of 3-chlorosulphonyl-4-chlorobenzoic acid which is pure enough to be submitted to the following procedure are obtained. After recrystallization from acetonitrile it melts at 170–1° C.

195 g. of the acid so prepared are mixed with 175 g. of phosphorus pentachloride. A vigorous reaction occurs, which is completed by heating the mixture for 2–3 hours at 110° C. The reaction products are distilled at a reduced pressure and 3 - chlorosulphonyl - 4 - chlorobenzoyl chloride is obtained, which boils at 158° C./1 mm. Hg. Yield: 184 g.

200 g. of 3-chlorosulphonyl-4-chlorobenzoyl chloride are added, drop by drop, to a solution of concentrated ammonium hydroxide, cooling externally with ice water. The mixture is shaken vigorously for some hours, and the solid which has separated out is then filtered off. A further yield of the same solid is obtained by concentrating the reaction liquid until the ammonia is eliminated. The solid products are crystallized from water, and 3-sulphamido-4-chlorobenzamide is obtained, M.P. 223–5° C., in a yield of 138 g.

107 g. of 3-sulphamido-4-chlorobenzamide are added to 355 g. of phosphorus oxychloride, and the mixture is heated cautiously. The reaction begins at about 40° C., and is completed by heating at 110° C. for 4 hours. The excess $POCl_3$ is eliminated by distillation at reduced pressure and the traces which remain are decomposed with crushed ice. The product, 3-sulphonamido-4-chlorobenzonitrile, melts at 197–9° C., after crystallization from alcohol. Yield: 94 g. Analysis: Found Cl percent=16.35; calc. for $C_7H_5ClN_2O_2S$, Cl percent=16.37.

EXAMPLE III

3-sulphamido-4-chlorobenzamidoxime

A solution of hydroxylamine is prepared from 49 g. of the hydrochloride, dissolved in 50 cc. of water, and 15 g. of metallic sodium dissolved in 500 cc. of absolute ethanol. The solution is filtered from the sodium chloride and 113 g. of 3 - sulphamido - 4 - chlorobenzonitrile are added. The mixture is refluxed for 4 hours, and most of the 3-sulphamido-4-chlorobenzamidoxime separates out during the heating, but a further small quantity of product is also obtained by concentrating the alcoholic mother liquors. The product is crystallized from water, and 115 g. of the benzamidoxime are obtained, M.P. 185–7° C. (dec.). Analysis: Found N percent=16.93; calc. for $C_7H_8ClN_3O_3S$, N percent=16.83.

EXAMPLE IV

3-p-sulphamidophenyl-5-butylaminomethyl-1,2,4-oxadiazole 0.1 mole of chloroacetyl chloride dissolved in 50 cc. of anhydrous acetone are added slowly to a suspension (shaken mechanically) of 0.1 mole of p-sulphamidobenzoamidoxime, 0.05 mole of anhydrous postassium carbonate and 150 cc. of anhydrous acetone. The shaking is continued for about one hours after the end of the addition. The reaction mixture is concentrated under reduced pressure and the residue is dissolved in water. The o-chloroacetyl-p-sulphamidobenzamidoxime which has been formed is filtered, and melts at 137° C. (dec.). By heating o-chloroacetyl-p-sulphamidobenzamidoxime at reduced pressure above its boiling point, it is transformed completely into 3-p-sulphamidophenyl-5-chloromethyl-1,2,4-oxadiazole. The overall yield is 82%.

A solution of 0.025 mole of 3-p-sulphamidophenyl-5-chloromethyl-1,2,4-oxadiazole in 100 cc. of absolute ethanol is added to a boiling solution of 0.1 mole of butylamine in 30 cc. of absolute ethanol. The heating is continued for 4 hours, the solvent is eliminated under reduced pressure, and the residue is washed with water, and crystallized from alcohol. 3-p-sulphamidophenyl-5-butylaminomethyl-1,2,4-oxadiazole, thus obtained, melts at 198°–9° C. The hydrochloride melts at 244–6° C. The yield is 85%. Analysis: found Cl percent=10.10; calc. for $C_{13}H_{19}ClN_4O_3S$, Cl percent=10.23.

EXAMPLE V

3-p-sulphamidophenyl-5-β-diethylaminoethyl-1,2,4-oxadiazole

A solution of 0.1 mole of β-chloropropionyl chloride in 50 cc. of anhydrous acetone is added slowly to a shaken and cooled suspension of 0.1 mole of p-sulphamidobenzamidoxime, 0.05 mole of postassium carbonate and 150 cc. of anhydrous acetone. The shaking is continued for some time after the end of the addition, the solvent is then eliminated under reduced pressure, and the residue is washed with water. The o-β-chloropropionyl - p - sulphamidobenzamidoxime so obtained is pure enough for the next procedure.

The compound is suspended in benzene (0.04 mole in 100 cc.) and a solution of 0.1 mole of diethylamine in 50 cc. of benzene is added. The mixture is refluxed for 30 minutes and the heating is then continued for two hours, eliminating azeotropically the water which has been formed in the reaction. The reaction mixture is cooled, and extracted with dilute hydrochloric acid. The aqueous layer is made alkaline with potassium carbonate, and 3 - p-sulphamidophenyl-5-β-diethylaminoethyl-1,2,4-oxadiazole separates out. It is filtered off, washed with water and dried. It melts at 131–2° C. and its hydrochloride melts at 170° C. Analysis: found Cl percent=9.98; calc. for $C_{14}H_{21}ClN_4O_3S$, Cl percent=9.83.

EXAMPLE VI

3-m-sulphamidophenyl-5-diethylaminomethyl-1,2,4-oxadiazole 9.7 g. of m-sulphamidobenzamidoxime and 3.5 g. of anhydrous potassium carbonate are added to 200 cc. of anhydrous acetone. While the mixture is cooled externally with ice water and shaken vigorously, an acetonic solution containing 5.65 g. of chloroacetyl chloride is added slowly; the shaking is continued for some time, and the solvent is then eliminated under reduced pressure. The residue is washed with water and dried in a vacuum desiccator. The o - chloroacetyl - m-sulphamidobenzamidoxime so obtained is pure enough for the next procedure. A sample crystallized from a mixture of dimethylformamide and water melts at 142–3° C. (dec.). Analysis: found Cl percent=12.31; calc. for $C_9H_{10}ClN_3O_4S$, Cl percent=12.16.

After heating for 20 minutes at 180° C. under reduced pressure, the substance is transformed into the corresponding oxadiazole. Purification of the product is not required.

30 cc. of absolute alcohol and 10 cc. of anhydrous diethylamine are added to the product and the mixture is refluxed for 2 hours. After elimination of solvent under reduced pressure a solid remains, and this is washed with water. 3-m-sulphamidophenyl-5-diethylaminomethyl-1,2,4-oxadiazole is thus prepared. It can be crystallized from water and then melts at 93–5° C. The hydrochloride melts at 167–9° C. Analysis: found Cl percent=10.13; calc. for $C_{15}H_{19}ClN_4O_3S$, Cl percent=10.22.

EXAMPLE VII

3-p-sulphamidophenyl-5-γ-piperidinopropyl-1,2,4-oxadiazole 8.1 g. of γ-chlorobutyryl chloride are dissolved in 30 cc. of acetone. This solution is added to a suspension of 11.7 g. of p-sulphamidobenzamidoxime and 4 g. of anhydrous potassium carbonate in 200 cc. of anhydrous acetone. The mixture is shaken and cooled to keep it at room temperature. After shaking for four hours, the solvent is eliminated under reduced pressure and the residue is washed with water. The product is dried in a vacuum desiccator and the o-γ-chlorobutylryl-p-sulphamidobenzamidoxime so obtained, after crystallization from alcohol, melts at 138–9° C. (dec.). Analysis: found S percent=10.15; calc. for $C_{11}H_{14}ClN_3O_4S$, S percent=10.03.

By heating at 140° C. at a pressure of 20–30 mm. Hg, the product is cyclized, and the corresponding 3-p-sulphamidophenyl-5-γ-chloropropyl-1,2,4-oxadiazole is obtained, which is crystallized from water and then melts at 144–5° C. (dec.). Analysis: found S percent=10.73; calc. for $C_{11}H_{12}ClN_3O_3S$, S percent=10.62.

5.2 g. of 3-p-sulphamidophenyl-5-γ-chloropropyl-1,2,4-oxadiazole and 3 g. of anhydrous piperidine are suspended in 75 cc. of anhydrous benzene and the mixture is heated in a closed tube at 130° C. for 16 hours. The contents of the tube are then cooled and the solvent is eliminated. The residue is washed with water (which dissolved the piperidine hydrochloride) and then crystallized from benzene. The yield is 6 g.; M.P. 138–40° C. The hydrochloride melts at 227° C. (dec.). Analysis: found Cl percent=9.15; calc. for $C_{16}H_{23}ClN_4O_3S$, Cl percent=9.17.

Using procedures similar to those described in the preceding examples, the following substances have also been obtained: o-chloroacetyl-3-sulphamido-4-chlorobenzamidoxime, M.P. 171° C. (dec.). Analysis: found N percent=12.90, Cl percent=21.58; calc. for $C_9H_9Cl_2N_3O_4S$, N percent=12.88, Cl percent=21.74.

3-(3-sulphamido-4-chlorophenyl) - 5 - chloromethyl-1,2,4-oxadiazole, M.P. 145–7° C. Analysis: found N percent=13.39, Cl percent=22.93; calc. for $C_9H_7Cl_2O_3N_3S$, N percent=13.64, Cl percent=23.02

3-(3-sulphamido-4-chlorophenyl) - 5 - diethylaminomethyl-1,2,4-oxadiazole, M.P. 112–4° C., whose hydrochloride has M.P. 228–9° C. Analysis: found Cl percent=9.35; calc. for $C_{13}H_{18}Cl_2N_4O_3S$, Cl percent=9.30.

3-(3-sulphamido - 4 - chlorophenyl)-5-β-diethylaminoethyl-1,2,4-oxadiazole hydrochloride, M.P. 194–5° C. Analysis: found Cl percent=18.17; calc. for $C_{14}H_{20}Cl_2N_4O_3S$, Cl percent=17.94

3-p-sulphamidophenyl - 5 - diethylaminomethyl-1,2,4-oxadiazole hydrochloride, M.P. 216–7° C. Analysis: found Cl percent=10.34; calc. for $C_{13}H_{19}ClN_4O_3S$, Cl percent=10.23.

3 - p - sulphamidophenyl-5-t-butylaminomethyl-1,2,4-oxadiazole, M.P. 216–8° C. whose hydrochloride has M.P. 250° C. Analysis: found Cl percent=10.28; calc. for $C_{13}H_{19}ClN_4O_3S$, Cl percent=10.23.

3 - p-sulphamidophenyl-3-dimethylaminomethyl-1,2,4-oxadiazole hydrochloride M.P. 244–5° C. Analysis: found Cl percent=10.83; calc. for $C_{11}H_{15}ClN_4O_3S$, Cl percent=10.62.

3 - p-sulphamidophenyl - 5 - pyrrolidinomethyl-1,2,4-oxadiazole, M.P. 129–30° C. whose hydrochloride has M.P. 230–1° C. Analysis: found Cl percent=10.27; calc. for $C_{13}H_{17}ClN_4O_3S$, Cl percent=10.29.

3 - p-sulphamidophenyl - 5 - morpholinoethyl-1,2,4-oxadiazole, M.P. 161–2° C., whose hydrochloride has M.P. 219–20° C. Analysis: found Cl percent=9.67; calc. for $C_{14}H_{19}ClN_4O_4S$, Cl percent=9.46.

The invention includes within its scope pharmaceutical compositions comprising one or more compounds of general Formula I in association with a pharmaceutical carrier. Such compositions, which may be, for example, for oral or parenteral administration, may be made up by conventional methods using the inert diluents commonly used in the art, such as solid diluents for the preparation of tablets and sterile injectable liquids for the preparation of compositions for injection.

I claim:
1. A compound selected from the group consisting of 3-p-sulfamylphenyl-5-butylaminomethyl-1,2,4 - oxadiazole and its non-toxic acid addition salts.
2. A compound selected from the group consisting of 3-p-sulfamylphenyl-5-β-diethylaminoethyl - 1,2,4 - oxadiazole and its non-toxic acid addition salts.
3. A compound selected from the group consisting of 3-m-sulfamylphenyl-5-diethylaminomethyl - 1,2,4 - oxadiazole and its non-toxic acid addition salts.
4. A compound selected from the group consisting of 3-p-sulfamylphenyl - 5 - γ - piperidinopropyl-1,2,4-oxadiazole and its non-toxic acid addition salts.
5. A compound selected from the group consisting of 3-(3-sulfamyl-4-chlorophenyl) - 5 - diethylaminomethyl-1,2,4-oxadiazole and its non-toxic acid addition salts.
6. A compound selected from the group consisting of 3-(3-sulfamyl - 4 - chlorophenyl)-5-β-diethylaminoethyl-1,2,4-oxadiazole and its non-toxic acid addition salts.
7. A compound selected from the group consisting of 3-p-sulfamylphenyl - 5 - diethylaminomethyl-1,2,4-oxadiazole and its acid non-toxic addition salts.
8. A compound selected from the group consisting of 3-p-sulfamylphenyl - 5 - t - butylaminomethyl-1,2,4-oxadiazole and its acid non-toxic addition salts.
9. A compound selected from the group consisting of 3-p-sulfamylphenyl - 5 - dimethylaminomethyl-1,2,4-oxadiazole and its non-toxic acid addition salts.
10. A compound selected from the group consisting of 3-p-sulfamylphenyl-5-pyrrolidinomethyl-1,2,4 - oxadiazole and its non-toxic acid addition salts.
11. A compound selected from the group consisting of 3-p-sulfamylphenyl-5-morpholinoethyl-1,2,4 - oxadiazole and its non-toxic acid addition salts.
12. A compound selected from the group consisting of compounds of the formula

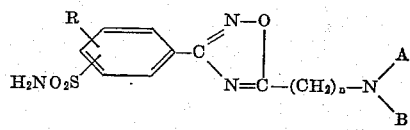

and their non-toxic acid addition salts, where R is selected from the group consisting of hydrogen and chlorine, n is an integer from 1 to 3 inclusive, and

is selected from the group consisting of amino, lower alkylamino, dilower alkylamino, pyrrolidino, piperidino and morpholino.

References Cited by the Examiner

UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |
| 2,362,614 | 11/1944 | Calva | 167—22 |
| 2,888,455 | 5/1959 | Kano et al. | 260—307 |

FOREIGN PATENTS 1,097,998    1/1961    Germany.

OTHER REFERENCES

Andrews et al.: Chem. Abstracts, vol. 38, page 6389 [1] (1944).

HENRY R. JILES, *Acting Primary Examiner.*

R. L. PRICE, JOSE TOVAR, *Assistant Examiners.*